3,117,916
METHOD FOR THE PREPARATION OF A COMPOSITION OF MATTER HAVING ANTITUMOR AND ANTIFUNGAL ACTIVITY

Joseph Frank Prokop, Mundelein, Ill., assignor to Abbott Laboratories, North Chicago, Ill., a corporation of Illinois
No Drawing. Filed May 22, 1962, Ser. No. 196,618
5 Claims. (Cl. 195—80)

This invention is concerned with a novel compound possessing antitumor and antifungal properties and to a process for its production. In particular, the invention relates to a new composition of matter referred to herein as antitumor agent M-741, to a process for its production by fermentation and to a method for its recovery, concentration and purification.

The principal object of the invention is to provide a new and useful composition of matter which is active in suppressing the growth of a variety of tumors. Another object is to provide a process for the preparation and recovery of M-741.

It has been found that by cultivating under controlled conditions and on suitable culture media a heretofore undescribed microorganism named *Streptoverticillium septatum*, a novel composition of matter herein identified as antitumor agent M-741 is obtained. The microorganism employed was isolated from a soil sample collected near Shiremanstown, Pennsylvania. A culture of the living organism has been deposited and is available at the Culture Collection Unit of the Northern Utilization Research and Development Division, U.S. Department of Agriculture, Peoria, Illinois, under the code number NRRL 2974. The complete taxonomy of the new isolate follows.

TAXONOMY OF *STREPTOVERTICILLIUM SEPTATUM*

With the exception of determining cultural characteristics and proteolytic activity in gelation which was done at 24° C., all cultural characteristics in the standard media listed below were obtained by incubation at 28° C.

The color code references, such as 3 ec, are those from the Color Harmony Manual, Third Edition, Jacobson, R.; Granville, W. C.; and Foss, C. E.; 1948; Container Corporation of America. The color names used are those designated in the ISCC—NBS Method of Designating Colors and a Dictionary of Color Names, U.S. Department of Commerce, National Bureau of Standards, Circular 553, issued November 1, 1955. As an example, the color of the removable plastic color chip coded 3 ec in the Color Harmony Manual is named light grayish yellowish brown on page 52 of the National Bureau of Standards Circular 553. In the following text of cultural characteristics, color names from the National Bureau of Standards Circular 553 are capitalized followed by the code of the matching color chip from The Color Harmony Manual in parentheses. Other color observations are not capitalized.

The morphological features of the organism hereinafter described places it with the group of organisms hitherto known as Streptomyces with biverticillate sporophores. However, in keeping with the proposal of Baldacci, E., Giorn. Microbiol. 6, 10–27, 1958, that actinomycetes with verticillate sporophores be classified under a new genus Streptoverticillium, the organism is assigned to this genus. Moreover, a survey of the literature failed to reveal species which satisfactorily agreed with characteristics of the organism hereinafter described. Accordingly, it is deemed to be a new species and is named *Streptoverticillium septatum*. The specific epithet refers to its characteristic septate aerial mycelium as will be described below.

Growth Characteristics of Streptoverticillium septatum
[15 days agar plates, 28° C., except when noted]

| Medium | Growth | Aerial Mycelium | Sporulation | Substratal (Reverse) | Soluble Pigment | Notes—Physiologic and Other |
|---|---|---|---|---|---|---|
| Complex media: | | | | | | |
| Nutrient agar | Good. Isolated colonies 4.0 mm. spreading over surface from flattened edges. | None. 21 days | None | Dark yellow (2 le) | Dark yellow (2 le) faint. | Occasional wisps or slender coremia observed microscopically. |
| Glucose agar | Excellent. Spreading 10.0 mm. over surface from confluent growth streak. | Sparse. Yellowish gray (2 cb) at edge, light brownish gray (3 fe) center confluent growth. | None. 21 days. | Dark yellow (2 le) at edge to moderate olive brown (2 pi) center confluent growth. | do | Abundant aerial wisps or long slender coremia (aerial aggregates). |
| Yeast—malt extract agar. | Excellent and rapid. Spreading flatly over surface from edge of colonies. | Abundant, fluffy, yellowish gray (2 cb). | Fair to moderate. | Center, moderate yellowish brown (3 ni); edge light olive brown (2 ng). | Very faint, dark yellow (2 le). | Abundant microexudate. |
| Soluble starch yeast extract, salts agar. | Good. No well isolated colonies. | Moderate, fluffy 15 days, abundant 21 days—yellowish gray (2 cb). | Sparse | Dark grayish yellow (2 ie). | Questionable to none. | Hydrolysis strongly positive. |
| Defined media: | | | | | | |
| Czapeks, dextrose agar. | Slow. Low convex colonies, flat edge, slight radial wrinkling, slight spreading over surface of agar. | Very sparse, white | None through 21 days. | do | None | Rare wisps observed microscopically. 2.0 mm. zone of increased transparency of medium at edge of growth. |
| Dextrose asparagine agar. | Initially slow becoming good. Isolated colonies 4.0 mm. spreading over surface. | Fluffy, moderate to good. Pale yellow green (1 ba) 15 days to yellowish gray (2 cb) 21 days. | Fair to moderate. | Moderate olive (1½ lg). | do | Abundant microdrops of clear exudate 21 days. |
| Calcium malate agar. | Fair. Isolated colonies flat, 2.0 mm., entire edges. | Sparse, white | None through 21 days. | | do | No visible clearing through 21 days. |
| Inorganic salts, soluble starch agar. | Initially slow, becoming good. | Abundant, fluffy 21 days yellowish gray (2 cb). | Fair | Dark grayish yellow (2 ie). | do | Hydrolysis strongly positive. |
| Modified Pridham and Gottlieb basal with dextrose (CuSO⁴ omitted). | Abundant. Isolated colonies 8.0 mm. full aerial. | Abundant, fluffy or cottony, light grayish yellowish brown (3 ec). | Abundant | Grayish yellow (2 ge) | do | Growth extremely limited in same medium with $CuSO_4$ at recommended level. |

PHYSIOLOGIC CHARACTERISTICS

Synthetic nitrate agar—no growth.

Nutrient nitrate agar—abundant growth. Test for nitrite negative at 2, 8 and 15 days.

Tryptose agar with human blood—marked hemolysis.

Plain gelatin—good growth, very weak liquefaction, dark brown soluble pigment at top of plug.

Litmus milk—good growth, reaction unchanged, no coagulation, very slight peptonization.

$H_2S$ production—weakly positive.

Starch—hydrolyzed.

MICROMORPHOLOGY

The fruiting structure is biverticillate in all media in which spores are produced although a rare chain of spores may be found at the end of short branches arising singly from the main aerial filaments. Primary verticils are short and sterile, spores being produced in secondary verticils. Uniformly the primary verticils arise immediately posterior to a septum in the aerial mycelium. On some media, primary verticils alone may be found typically branching from the aerial mycelium at the site of septation with no spores formed in the absence of secondary verticils. The mycelium at the site of septation is slightly constricted. This feature is best noted prior to and during the emergence of primary verticils.

Spore chains of the secondary verticils are short and devoid of hooks, loops, or spirals. The mature spores are predominantly bacillary in morphology with a low percentage of oval forms being noted. The length to width ratio averages 2:1 as measured from electron micrographs. The spore surface is smooth.

CARBOHYDRATE UTILIZATION

Growth of *S. septatum* is severely restricted in the basal medium of Pridham and Gottlieb, J. Bact. 56–: 107–114, with the addition of dextrose or glycerol. Following a metal tolerance study, the elimination of $CuSO_4$ from the medium permitted good growth. The following table of carbohydrate utilization shows results obtained in the basal medium modified by the elimination of $CuSO_4$. Carbohydrate sources shown as unavailable in the modified medium also failed to support growth in the complete medium.

*Carbohydrate Utilization by* Streptoverticillium septatum

| Source | Utilization | Growth |
|---|---|---|
| Xylose | − | |
| Arabinose | − | |
| Rhamnose | − | |
| Dextrose | + | Rapid. |
| Sucrose | − | |
| Lactose | − | |
| Cellobiose | − | |
| Raffinose | − | |
| Salicin | − | |
| Glycerol | + | Rapid. |
| Mannitol | − | |
| Inositol | + | Moderate. |
| Sorbitol | − | |
| Sodium citrate | + | Slow. |
| Sodium acetate | + | Slow to moderate. |
| Sodium potassium tartrate | − | |
| Control—No carbon source added | − | |

The present invention embraces a process for growing *Streptoverticillium septatum* under controlled conditions which include a temperature of 24° to 32° C., submerged fermentation with suitable agitation and aeration using a medium consisting of a carbon source such as glucose, glycerol, trans-esterified vegetable oils, or a combination of these; a source of organic nitrogen such as soybean meal; a source of growth substances and minerals such as distillers solubles or corn steep liquor; mineral salts such as sodium chloride; an insoluble buffering agent to prevent the accumulation of acid such as calcium carbonate; and a non-toxic defoaming agent such as transesterified vegetable oils or soybean oil plus methylpolysiloxane antifoam or a polypropylene glycol such as that marketed under the trade name Polyglycol P-2000 by the Dow Chemical Company, Midland, Michigan. When the growth of the organism has produced a satisfactory amount of antibiotic substance as indicated by assays in vivo against Sarcoma 180 in the Swiss mouse, the culture is filtered and the antitumor agent recovered from the filtrate. In practice, since this assay requires a prolonged period of time, the culture is filtered at a time when the activity is presumed to be present in satisfactory amounts, and the recovery procedures carried out while waiting for results of the Sarcoma 180 assay. A process involving the use of a cation exchange resin will remove the activity from the filtrate, and the activity can be readily eluted from the resin by the use of a mineral acid. Since during the elution a reasonable approximation of the amount of activity present can be obtained by measuring the optical density of the eluate at between 275 and 280 mu, it is often best to process a small aliquot of a culture filtrate through the elution from the cation exchange resin and measure the optical density of the eluate and use this data to decide whether there is a satisfactory amount to warrant processing the entire filtrate. After elution from the cation exchange resin, the antibiotic can be further purified by dialysis and by precipitation from the concentrated and acidified dialyzed solution by a water miscible solvent such as acetone, methanol or ethanol.

Inoculum suitable for use in shaken flasks can be obtained by using the growth from tryptone agar slants. This medium can also be used to maintain, by transfer from slant to slant, suitable viable cultures which produce the antitumor substance. However, in general practice, the maintenance of the *Streptoverticillium septatum* in soil or under lyophilization has proven a more dependable procedure. The growth on agar slants is used to inoculate shaken flasks which in turn may be used to inoculate fermentors of the size used for research purposes.

For production in a 23 liter fermentor, a satisfactory seed can be produced by first transferring from an agar to a shaken flask and permitting the flask to incubate on a rotary shaker for 2 days and using this shaken culture to inoculate sufficient shaken flasks to provide a satisfactory volume of inoculum for the 23 liter fermentor. This second passage of shaken culture is also continued for 2 days. However, satisfactory growth for inoculum purposes can be obtained in 24 hours. In general, the production of the antitumor agent in the 23 liter fermentor reaches satisfactory yields in 3 to 4 days, and there is no advantage in extending the fermentation beyond the 4 days. Aerobic conditions are maintained in the fermentors by forcing sterile air through a dispersing device in the bottom of the fermentor. The rate of air forced into the culture medium varies somewhat with the size and shape of fermentation vessel. An aeration rate of ⅘ volume to one volume of air per volume of culture per minute is satisfactory. Foaming of the culture medium during fermentation may be controlled with non-toxic vegetable oils, such as transesterified vegetable oils, a methylpolysiloxane antifoam dissolved in a vegetable oil such as soybean oil, or a polypropylene glycol such as Polyglycol P-2000. Throughout the fermentation period, the culture medium is vigorously agitated by stirring devices which are part of the fermentation units. The degree of agitation is dependent upon the design of the varied sized fermentation vessels, since it is well understood that pilot and commercial sized fermentation tanks are designed for general usage rather than for a specific fermentation process. While particulars have been given for 23 liter fermentors, it should be recognized, as anyone experienced in the art will know, that the fermentation may be carried out, with the usual modifications, in smaller fermentors or in fermentors reaching up to the sizes used in commercial scale productions. The organism *Streptoverticillium septatum* is able to produce the desired antitumor agent in satisfactory amounts in a limited variety of culture media, over a temperature range of at least 24°–32° C., and it is apparently not necessary to maintain an exact aeration or a precise amount of mechanical agitation.

The following examples illustrate the formation, recovery, concentration, and purification of antitumor agent M-741. These examples are merely illustrative in nature and are not to be construed as limiting.

*Example 1*

FERMENTATION IN SHAKEN FLASK

*Streptoverticillium septatum* was seeded from soil stock to an agar slant of the following composition and incubated for about five days at 28° C.

| | | |
|---|---|---|
| Tryptone | grams | 3 |
| Beef extract | do | 3 |
| Cerelose (glucose) | do | 1 |
| Yeast extract | do | 1 |
| Agar | do | 15 |
| $H_2O$ | liters | 1.0 |

After incubation, the resulting growth was scraped from the agar slant and introduced into 150 ml. of medium of the following composition in a 500 ml. Erlenmeyer flask.

| | | |
|---|---|---|
| Soybean meal | grams | 15 |
| Cerelose (glucose) | do | 15 |
| NaCl | do | 5 |
| $CaCO_3$ | do | 1 |
| $H_2O$ | liters | 1 |

This flask was incubated for 48 hours at 28° C., on a rotary shaker describing a 2¼ inch eccentric at about 240 r.p.m. Following this, another flask containing sterile medium of the same composition was seeded with about 4% v./v. of the resultant growth from the first flask. This flask was also incubated for 48 hours at 28° C. with shaking.

For production, a 500 ml. Erlenmeyer flask containing 150 ml. of sterilized medium of the following composition was seeded with 4% v./v. of material from the second 48 hour flask. Incubation and agitation for this flask was as before with the exception that the incubation period was for approximately 72 hours.

| | | |
|---|---|---|
| Soybean meal | grams | 10 |
| Cerelose (glucose) | do | 10 |
| NaCl | do | 5 |
| $CaCO_3$ | do | 1 |
| $H_2O$ | liters | 1 |

After incubation, the resultant material was harvested and the filtrate tested for activity against Sarcoma 180 in mice with the following results:

| Test No. | Dilution for dosage | Wt. change,[1] gram | T/C,[2] percent |
|---|---|---|---|
| 1 | 1:16 | −1.0 | 36 |
| 2 | 1:16 | −1.0 | 36 |
| 3 | 1:16 | −2.8 | 44 |

[1] Difference in average weight gain or loss in controls and that of test animals.
[2] Average tumor weight of test animals as a percent of average tumor weight of controls.

*Example 2*

PRODUCTION IN 23-LITER FERMENTORS WITH A SOYBEAN MEAL-GLUCOSE-SODIUM CHLORIDE MEDIUM

To a 500 ml. Erlenmeyer flask is added 150 ml. of a seed medium containing the following ingredients in the concentrations given:

| | Grams per liter |
|---|---|
| Glucose monohydrate | 15 |
| Soya-fluff flour (finely ground defatted soybean meal) | 15 |
| Sodium chloride | 5 |
| Calcium carbonate | 1 |

The flask and its contents are sterilized by autoclaving for a period of 25 to 30 minutes at a temperature of 121° C. After cooling, the flask is inoculated with a section from the surface of a tryptone agar slant on which *Streptoverticillium septatum* has been growing for at least 3 days. The inoculated flask is agitated at 28° C. on a rotary shaker having a stroke of 2¼ inches and operating at about 230 r.p.m. for a period of 48 hours. A second passage of the seed culture is prepared by using the above culture to inoculate additional flasks prepared and sterilized as above. Each flask is inoculated with about 3 ml. of the 48-hour culture. The seed flasks are incubated and agitated as just described for 48 hours.

In a fermentation tank of 23-liter capacity is placed 12 liters of a fermentation medium having the following composition:

| | Grams per liter |
|---|---|
| Glucose monohydrate | 25 |
| Soybean meal | 20 |
| Calcium carbonate | 1 |
| Sodium chloride | 5 |

To the above is added 0.1% by volume of Polyglycol P-2000 as an antifoam agent. The fermentor and its contents are sterilized by autoclaving for 75 minutes at 121° C. After cooling, the fermentor is inoculated aseptically with the contents of three of the above described flasks of second passage seed culture. The culture is grown in the fermentor at 28° C. for 3 days during which time the broth is stirred mechanically and sterile air is passed into the bottom of the tank at the rate of about 0.8 volume of air per volume of broth per minute. The maximum antitumor activity is reached after about 3 days. The presence of the antitumor agent is demonstrated when a 1:128 dilution of a sample of filtered beer markedly inhibits the growth of transplanted Sarcoma 180 tumor in the Swiss mouse, when injected daily at a rate of 1 ml. per day over a six day period. Under these conditions the growth of the tumor in the treated mice averages, in three separate tests, 27%, 51%, and 20% of the growth of tumors in untreated controls.

RECOVERY OF ANTITUMOR AGENT M-741 FROM 23-LITER FERMENTOR BEER

About 120 liters of beer produced as in Example 2 are filtered with suction to yield about 100 liters of filtrate. The filtered beer is passed over a column 3″ in diameter and 48″ in height of a cation exchange resin composed of a cross-linked copolymer of methacrylic acid and divinyl benzene, containing between 4 and 10 mol percent of divinyl benzene, marketed under the tradename "IRC-50," in the sodium form. Those familiar with the art will recognize that the process is not limited to this particular resin, but that other cation exchange resins of similar or diverse nature can also be used. After the beer has gone through the column, the column is washed with 58 liters of deionized dwater and developed with 0.5 N HCl. Here again, those familiar with the art will recognize that development is not necessarily limited to this normality of HCl or to this particular mineral acid. During the development, the effluent is sampled regularly and the optical density of these samples at 275 mu is measured. When the optical density has reached 1.0, fractions are collected and pooled while the optical density rises to a maximum greater than 2.0 and drops back to 1.25. Fractions can be collected after this point, while there is a gradual drop in the density, but there is a sharp rise in impurities, and in practice it is better to accept a small loss in antitumor activity and avoid a large increase in impurities. The pool of the high optical density fractions has a volume of between 8 and 9 liters. This is concentrated, for convenience, on a vertical tube evaporator under vacuum at a temperature of less than 32° C. to a volume of 2 liters. The optical density of this concentrate at 275 mu is 11.70.

This material is dialyzed against running deionized water. After dialysis, the volume has expanded to about 3500 ml. and the solution now contains a precipitate.

This precipitate is separated by centrifugation and is further purified by extraction with two 25 ml. portions of 0.02 N HCl. The insoluble material is removed by centrifugation, and to the clear supernatant is added about 7 volumes of acetone. A white precipitate forms and the suspension is allowed to stand at about 4° C., overnight. The precipitate is separated by filtration and washed on the paper with first about 50 ml. of a solution composed of 7 parts acetone and 1 part deionized water and finally with 50 ml. of dry acetone. The precipitate is then removed from the paper and dried overnight in a vacuum dessicator over concentrated $H_2SO_4$. The weight of this precipitate is 564.7 mg. This precipitate, Precipitate I, inhibits the development of transplanted Sarcoma 180 in the Swiss mouse to 22% of that in untreated controls when injected over a 6 day period at a level of 0.062 mg./kg./day.

The original 3500 ml. of dialyzed eluate after the removal of the above described precipitate is concentrated in a vertical evaporator to 250 ml. Late in the concentration, another precipitate appears which is also removed by centrifugation. This precipitate is extracted once with a 25 ml. portion of 0.02 N HCl. Only a trace of solid material is left. This is removed by centrifugation and to the supernatant is added 7 volumes of acetone. A white precipitate appears. This is also allowed to stand at about 4° C. overnight, is separated by filtration, is washed with about 50 ml. of a solution composed of 7 parts acetone and 1 part deionized water followed by 50 ml. of dry acetone. It is removed from the paper and dried overnight in a vacuum dessicator over concentrated $H_2SO_4$. The yield of amorphous slightly off-white powder is 122.1 mg. This precipitate, Precipitate II, inhibits the development of transplanted Sarcoma 180 in the Swiss mouse when injected over a 6 day period at 0.25 mg./kg./day to 18% of that in untreated controls.

The 250 ml. of supernatant from which the above described precipitate has been obtained is further purified by adding 5 ml. of 1.0 N HCl, so that the solution is now a 0.02 N HCl solution. Seven volumes of acetone are now added. A white precipitate appears. The suspension is allowed to stand at about 4° C. for about 12 hours, after which the precipitate is removed by filtration, washed with 250 ml. of a 7 parts acetone and 1 part deionized water solution, and finally washed with about 250 ml. acetone. The precipitate is removed from the paper and dried overnight in a vacuum dessicator over concentrated $H_2SO_4$. The yield of amorphous slightly off-white powder is 3.2851 grams. This precipitate, Precipitate III, inhibits the development of transplanted Sarcoma 180 in the Swiss mouse when injected over a 6 day period at 0.084 mg./kg./day to 20% of that in untreated controls.

All preparations show similar ultra-violet curves with weak maxima at 278 mu and an extinction coefficient of $$E_{1\,cm.}^{1\%} = 17$$

BIOLOGICAL ACTIVITY OF M-741

The following microorganisms are not inhibited in their growth on agar containing 100 micrograms/ml. of M-741.

*Agrobacterium tumefaciens*
*Aspergillus niger*
*Bacillus subtilis*
*Candida albicans*
*Erwinia amylovora*
*Escherichia coli*
*Fusarium oxysporum*
*Klebsiella pneumoniae*
*Mycobacterium smegmatis*
*Neisseria catarrhalis*
*Proteus vulgaris*
*Pseudomonas tabaci*
*Salmonella typhosa*
*Staphylococcus aureus*
*Streptococcus faecalis*
*Xanthomonas phaseoli*
*Xanthomonas vesicatoria*

In a tube dilution assay, the following microorganisms are not inhibited in their growth by the presence of 1000 micrograms/ml. of M-741:

*Escherichia coli*
*Proteus mirabilis*
*Proteus vulgaris*
*Pseudomonas aeruginosa*
*Salmonella typhimurium*
*Staphylococcus aureus*, Smith The following microorganisms are not inhibited by 200 mcg/ml. of M-741:

*Klebsiella pneumoniae*
*Salmonella typhosa*
*Staphylococcus aureus*, Wise 155
*Streptococcus faecalis*

The following fungi are inhibited by the presence of M-741 in agar at the concentrations indicated:

| Fungus tested: | Minimum inhibitory concentration, micrograms/ml. |
|---|---|
| Alternaria species | 1,000 |
| Aspergillus versicolor | 1,000 |
| Chaetomium globosum | 500 |
| Fusarium oxysporum | 1,000 |
| Myrothecium verrucaria | 500 |
| Penicillin citrinum | 5,000 |

ANTITUMOR PROPERTIES OF M-741

M-741 shows activity in varying degree against a wide variety of transplantable tumors in the mouse and rat. These are listed below.

| Tumor: | Dose level at which M-741 is active (mg./kg./day) |
|---|---|
| Sarcoma 180 | 0.2 |
| Sarcoma 180 (ascites form) | 0.1 |
| Mammary adenocarcinoma EOTH | 0.1 |
| Miyono adenocarcinoma | 0.1 |
| Ridgeway osteogenic sarcoma | 0.1 |
| Carcinoma 1025 | 0.2 |
| Bashford carcinoma 63 | 0.1 |
| Ehrlich carcinoma | 0.1 |
| Ehrlich carcinoma (ascites form) | 0.1 |
| Lewis lung carcinoma | 0.2 |
| Glioma 26 | 0.2 |
| Harding-Parsey melanoma | 0.2 |
| Walker carcinoma 255 | 0.2 |
| Murphy-Sturm lymphosarcoma | 0.2 |
| Flexner-Jobling carcinoma | 0.2 |
| Novikoff rat hepatoma | 0.2 |
| Wagner osteogenic sarcoma | 0.025 |
| L-4946 | 0.1 |
| Iglesias sarcoma | 0.2 |

What is claimed is:

1. A process for the production of a composition of matter having antitumor and antifungal activity which comprises cultivating the organism *Streptoverticillium septatum* under submerged aerobic conditions in a culture medium containing assimilable sources of carbohydrates, organic nitrogen and inorganic salts until substantial antitumor activity is produced by said organism and recovering the resultant product from said culture medium.

2. A process as claimed in claim 1 in which the organism employed is *Streptoverticillium septatum* NRRL 2974.

3. A process as claimed in claim 2 in which the culture medium is maintained at a temperature of from 24°–32° C. for a period of from 2 to 4 days.

4. A process as claimed in claim 2 which includes the steps of clarifying the culture medium, adsorbing the active component therefrom with a solid adsorbent and eluting the adsorbate.

5. The product produced by the process of claim 1.

No references cited.